(No Model.) 2 Sheets—Sheet 1.

O. HAMMERSTEIN.
MACHINE FOR CUTTING AND PILING CIGAR WRAPPERS.

No. 293,733. Patented Feb. 19, 1884.

Witnesses:
John C. Tunbridge
John M. Speer

Inventor:
Oscar Hammerstein
by his attorneys
Briesen & Steele

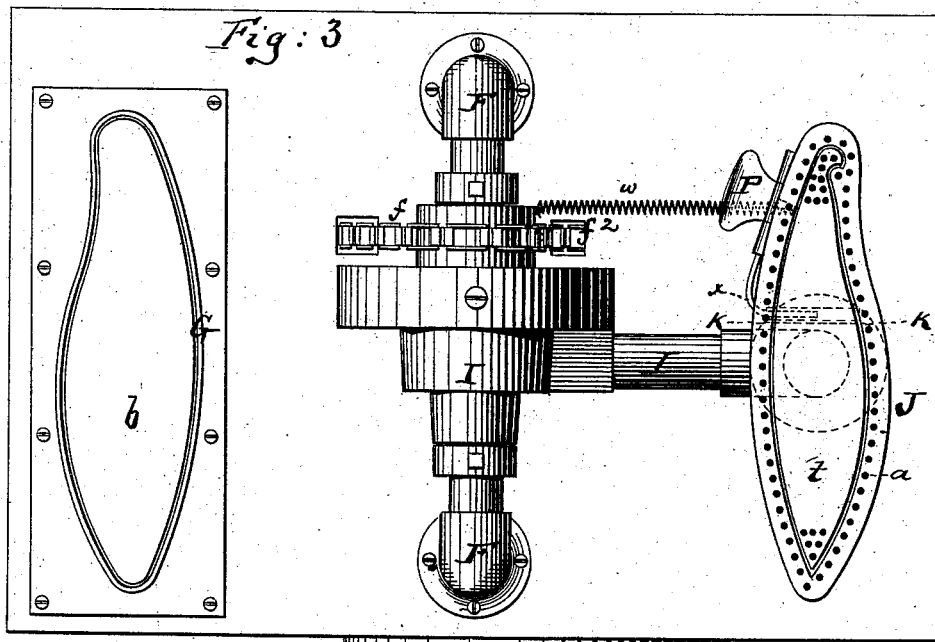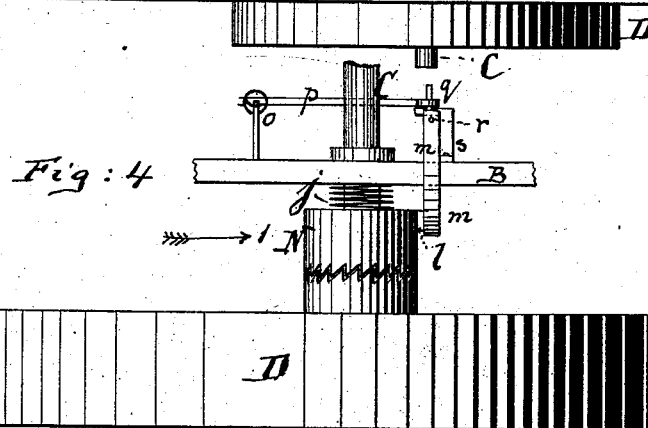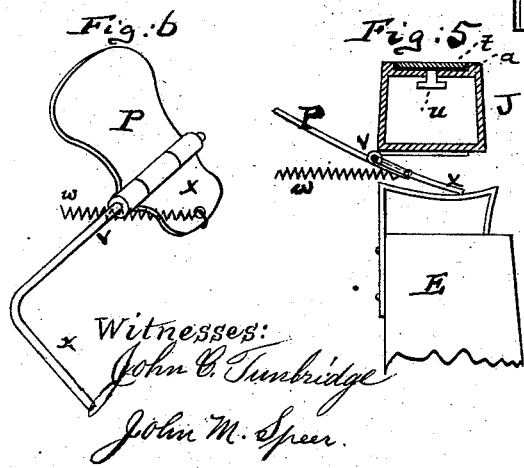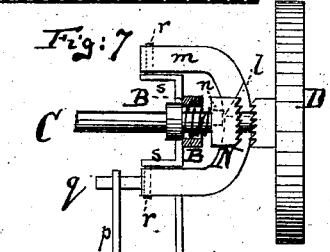

UNITED STATES PATENT OFFICE.

OSCAR HAMMERSTEIN, OF NEW YORK, N. Y., ASSIGNOR TO MALVINE HAMMERSTEIN, OF SAME PLACE.

MACHINE FOR CUTTING AND PILING CIGAR-WRAPPERS.

SPECIFICATION forming part of Letters Patent No. 293,733, dated February 19, 1884.

Application filed August 24, 1883. (No model.)

*To all whom it may concern:*

Be it known that I, OSCAR HAMMERSTEIN, a resident of the city of New York, in the county of New York and State of New York, have invented an Improved Machine for Cutting and Piling Cigar-Wrappers and the like, of which the following is a full, clear, and exact description, reference being made to the accompanying drawings, in which—

Figure 1:
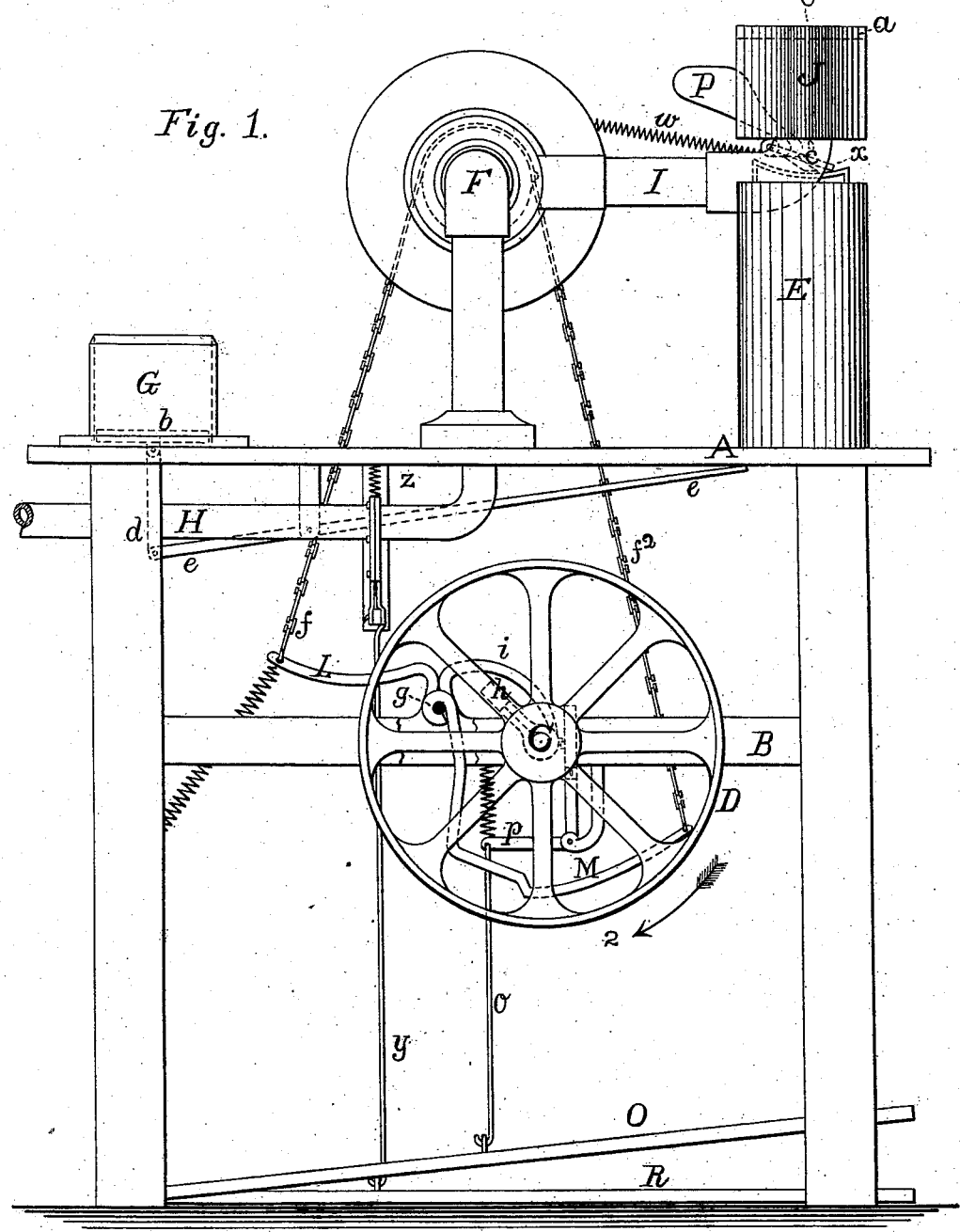
Figure 2:
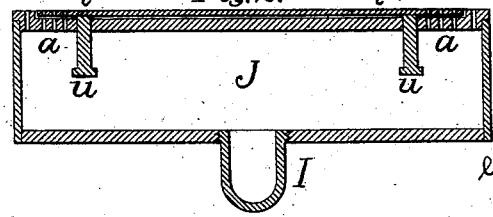

Figure 1 is a side elevation of my improved machine for cutting and piling cigar-wrappers and the like. Fig. 2 is a vertical section of the movable suction-box, the line $c\,c$, Fig. 1, indicating the plane of section. Fig. 3 is a plan or top view of the machine. Fig. 4 is an enlarged top view of the clutch mechanism. Fig. 5 is a vertical transverse section on the line $k\,k$, Fig. 3. Fig. 6 is a detailed perspective view of the leaf-holding attachment; and Fig. 7, a side view, partly in section, on a reduced scale, of the clutch mechanism.

This invention relates to a new machine for cutting out cigar wrappers, binders, or the like from leaves of tobacco, and for collecting the wrappers, binders, or the like in piles after they have been cut; and the invention consists in a new construction of suction-box, by means of which the wrapper is not only fed to the place of deposit, but also detached from the suction apparatus when the place of deposit has been reached.

The invention also consists in an automatic clamp attachment to the suction-box, by which that portion of the leaf which is not cut out to constitute part of the wrapper, binder, or the like is held in contact with the moving suction-box, and brought into convenient position to be replaced upon the latter to cut out another wrapper, binder, or the like, &c.

It also consists in further details of improvement, that are hereinafter more fully specified.

In the accompanying drawings, the letter A represents a platform or table, which is supported on a suitable frame-work, B, which in turn supports the devices with which the wrapper, binder, or the like is to be brought into absolute contact.

In the framing B are the bearings of a shaft, C, on which is hung the pulley D, to which rotary motion in the direction of the arrow 2, that is shown in Fig. 1, is constantly imparted by a belt from a suitable steam-engine, or by other means. The movement of the pulley can be imparted to the shaft C by the clutch mechanism hereinafter described, or by other means.

The table A supports a block or platform, E, a horizontal tube, F, and a box-like structure, G, of which the upper end is provided with a knife-edge, as indicated in Fig. 1. The horizontal pipe F is midway between the parts E and G, and connects by a tube, H, with suitable apparatus for creating air-suction. Around the horizontal tube F is swiveled the hub of a tranverse tube, I, the outer end of which is formed into a box or enlargement, J, which, when directly above the block or platform E, as in Fig. 1, has its perforated face-plate $a$ at its upper side, (see Figs. 2 and 5,) but which can be swung together with the pipe I, so that it will bear on the structure G, in which case said perforated face-place $a$ will be at the bottom of the enlargement J.

The bottom of the box-like structure G is movable. It is indicated at $b$ in Fig. 1, and shown to be connected by a stem, $d$, with a lever, $e$. Now, the object of this machine can be restated to be the placing of a piece of tobacco on the perforated top plate, $a$, when the same is in the position shown in Fig. 1, and holding it on said perforated top plate by suction, the bringing it over to the box-like structure G, while under the influence of suction, with such force, however, that the wrapper will be cut out of the piece of tobacco-leaf by the knife-edge of the structure G, and left within the said structure until a sufficient number of such wrappers have been cut out as to substantially fill the box-like structure G, when by lowering the free end of the lever $e$ the whole pile of wrappers, all properly shaped and flattened out, can be raised and removed from the box G for use in the manufacture of cigars.

When I say "wrappers" in the above clause, I desire to be understood that any other form into which tobacco or analogous matter may be cut will be equivalent, so far as the employment of my machine is concerned, to a cigar-wrapper.

In order to effectuate the operation of the machine as thus outlined in the foregoing statement, it is necessary that the leaf-carrier J should receive reciprocating rotary motion—that is to say, should be thrown over upon the box G and immediately back upon the platform E. It is likewise necessary that provison be made for detaching the wrapper from the carrier J as soon as it arrives on the structure G, as otherwise the wrapper might be taken back on the return-stroke of the carrier J. It is likewise desirable that that part of the tobacco-leaf which is not cut out by the knife-edge of the box G should remain on the carrier J and not on the box G.

I will first describe how the reciprocating motion is imparted to the wrapper-carrier J. The ends of two chains or bands, $f$ and $f^2$, are fastened to the hub of the swiveled tube I, or to disks or enlargements thereon, as indicated in Fig. 1. These chains pass through apertures in the table A, and have their lower ends respectively attached to levers L and M, that are pivoted at $g$ to the framing B of the machine. When the shaft C is itself revolved in the direction of the arrow 2, a crank or stud $h$, which it carries, will first be brought against an arm, $i$, of the lever L, and swing said lever L on the pivot $g$, so as to draw the chain $f$ downward and revolve the hub of the tube I, so as to carry the tube over to the other side and bring the wrapper-carrier J upon the box G. The stud $h$ now strikes the lever M, and thereby draws on the chain $f^2$, so as to swing the tube I and wrapper-carrier back into the position shown in Fig. 1.

It is essential that the wrapper-carrier J should remain stationary, as long as the attendant may desire, when it is in the position shown in Fig. 1, because greater or less time elapses with the proper handling and application of different leaves of tobacco; hence it is essential, also, that the automatic motion of the machine should be arrested as soon as the wrapper-carrier J arrives over the platform E. To this end the automatic-clutch arrangement, which I shall now describe, has been devised.

The shaft C carries a sliding clutch, N, which, by a spring, $j$, is liable to be thrown against the serrated or toothed hub of the wheel D, but is kept away therefrom by a projection, $l$, on a swinging plate, $m$, which projection $l$ bears against a tooth, $n$, that extends from the clutch N, Fig. 7, which is a side view of this apparatus, looking at it in the direction of the arrow 1. Fig. 4 shows the clutch held away from the wheel D.

When the attendant wants to set the machine in motion, he depresses a treadle, O, which connects by a rod, $o$, with an elbow-lever, $p$, that is hung in an arm of the frame B. The elbow-lever $p$ at its upper end connects by a pin, $q$, (see Figs. 4 and 7,) which projects from the horseshoe-shaped plate $m$, with the latter, said horseshoe-shaped plate $m$ being pivoted by the pins $r$ $r$ to a bracket, $s$, of the frame B. When the attendant depresses the treadle O, the lever $p$ is swung so as to cause the plate $m$ to turn on its pivots and carry the projection $l$ away from and out of contact with the tooth $n$, and thereby the spring $j$ is liberated, allowing the clutch N to engage with the wheel D, hence causing the shaft C to be turned; but as the shaft C completes its one revolution, the tooth $n$ arrives in contact with the inclined face or edge of the projection $l$, and is thereby, together with the clutch, gradually crowded back into the position which is shown in Fig. 7, thus automatically disengaging the shaft C from the moving mechanism at the end of one revolution of said shaft. Of course it is essential to this that the attendant should let go the treadle O as soon as he has started the rotation of the shaft C and before the first revolution of said shaft is completed, as otherwise the revolving tooth $n$ would not find the projection $l$ in its way.

I will now describe the enlargement J or suction-box at the end of the revolving pipe I, which suction-box I also have denominated the "wrapper-carrier" in this specification. The face-plate $a$ of this suction-box or wrapper-carrier is perforated, so as to hold the wrapper properly stretched and in contact with the said wrapper-carrier; but outside of the series of perforations there is a sufficient unperforated portion of said face-plate to allow the cutting-edge of the box-shaped receiver G to make a clean cut through the leaf of tobacco or other substance which is presented to it by the carrier J. The face-plate $a$, as is indicated in Figs. 2 and 5, is really made in two parts—a fixed part, which is the face-plate proper, and a movable part, $t$, which is to disengage the wrapper from the carrier J at the proper time. This movable part $t$ may also be perforated, as shown in Fig. 2, to assist in holding the wrapper by suction, and is connected with pins $u$, which are headed at their inner ends, as shown in Fig. 2, for the purpose of allowing vertical play to said plate $t$. When the wrapper is brought down upon the box G and cut out by the cutting-edge of the latter, the plate $t$, by its weight, drops upon the detached wrapper and throws it off the body of the face-plate $a$, depositing it on the bottom $b$ of the box G, or on the pile of wrappers thereon contained, and separating it from the influence of the suction which at this stage may still be created within the carrer J. I deem this movable plate $t$ important, as compared with an outside detaching-sleeve, which might embrace the wrapper-carrier J, for the reason that the plate $t$ will bodily detach from the suction-carrier that part which is embraced by the cutting-edge of the box-shaped receiver G. That part of the leaf of tobacco which is not cut out is to adhere to the carrier J. To this end said carrier has pivoted to it, at $v$, (see Fig. 5,) a spring-clamp, P, which clamp, by the spring $w$, is normally thrown against the side of the wrapper-carrier J, so as to clasp the overhanging part of the leaf of tobacco against the side of said carrier. When the carrier J is above the platform E, an arm, $x$, projecting from the clamp P, enters between the parts E and J, as in Fig. 5, and causes the clamp P to be swung away from the carrier J, so that the attendant may now take off that leaf and place it in a new position over the face-plate $a$ or replace it by another. As soon as this has been done and the machine started by the depression of the treadle O, the clamp P will at once be thrown against the side of the wrapper-carrier, so as to tightly hold the overhanging part of the wrapper to said carrier during both movements of the same.

The attendant can control the suction apparatus by means of the treadle R, which connects by a rod, $y$, with a slide or valve in the pipe H, a spring, $z$, tending to raise said slide or valve and to shut off the suction-apparatus, while the depression of the treadle R will open said valve and allow the suction to be utilized within the suction-box J. The knife-blade, instead of being formed on the box G, may as well be attached to the face-plate $a$. The operation in that case will remain substantially the same as that already described.

I claim nothing that is shown in application filed by me on the 23d day of May, 1883, for a patent for machine for manipulating cigar-wrappers, which application is known as Serial No. 95,871, and which was allowed on the 27th day of October, 1883.

I claim—

1. The combination of the suction-box J with the pipe I and mechanism, substantially as described, for moving the same, with the box-shaped receiver G, having upper-cutting-edge, and with the movable bottom $b$, substantially as specified.

2. The movable suction-box J, combined with the spring-clamp P, for operation substantially as herein shown and described.

3. The movable suction-box J, having perforated face-plate $a$, in combination with the movable portion $t$ of said face-plate, for disengaging from the suction-box the part cut out thereon, as specified.

4. The combination of the movable suction-box J and means, substantially as described, for moving it, with the perforated face-plate $a$, movable portion $t$ of said face-plate, and with a cutter which is adapted to cut the leaf of tobacco placed against the face-plate $a$, as specified.

5. The combination of the shaft C and its spur $h$ with the levers L M, chains $f$ $f^2$, swiveled tube I, and suction-box J thereon, substantially as and for the purpose specified.

OSCAR HAMMERSTEIN.

Witnesses:
 HARRY SMITH,
 WILLY G. E. SCHULTZ.